US011182536B2

(12) United States Patent
Fryc

(10) Patent No.: US 11,182,536 B2
(45) Date of Patent: Nov. 23, 2021

(54) SYSTEM AND METHOD FOR DYNAMIC WEBPAGE RENDERING WITH NO FLICKER OR FLASH OF ORIGINAL CONTENT

(71) Applicant: Exponea s.r.o., Bratislava (SK)

(72) Inventor: Lukas Fryc, Lany (CZ)

(73) Assignee: Exponea s.r.o., Bratislava (SK)

( * ) Notice: Subject to any disclaimer, the term of this patent is extended or adjusted under 35 U.S.C. 154(b) by 0 days.

(21) Appl. No.: 16/783,081

(22) Filed: Feb. 5, 2020

(65) Prior Publication Data

US 2021/0240914 A1    Aug. 5, 2021

(51) Int. Cl.
*G06F 40/143* (2020.01)
*G06F 40/151* (2020.01)
*H04L 12/66* (2006.01)
*H04L 29/08* (2006.01)

(52) U.S. Cl.
CPC .......... *G06F 40/143* (2020.01); *G06F 40/151* (2020.01); *H04L 12/66* (2013.01); *H04L 67/02* (2013.01); *H04L 67/20* (2013.01); *H04L 67/2842* (2013.01)

(58) Field of Classification Search
CPC ..... G06F 40/143; G06F 40/151; H04L 67/20; H04L 67/2842; H04L 12/66; H04L 67/02
See application file for complete search history.

(56) References Cited

U.S. PATENT DOCUMENTS

| | | | |
|---|---|---|---|
| 8,239,491 B1 * | 8/2012 | Tsun ................... | G06Q 30/0277 709/219 |
| 9,753,904 B2 | 9/2017 | Liu et al. | |
| 10,157,236 B2 | 12/2018 | Alstad | |
| 2002/0156812 A1 * | 10/2002 | Krasnoiarov ........... | H04L 29/06 715/234 |
| 2004/0049579 A1 * | 3/2004 | Ims ..................... | H04L 67/2823 709/225 |
| 2011/0238524 A1 * | 9/2011 | Green ................ | G06Q 30/0241 705/26.7 |
| 2014/0258843 A1 * | 9/2014 | Krueger ................ | G06F 40/166 715/234 |
| 2015/0066587 A1 * | 3/2015 | Glommen ............. | G06F 16/958 705/7.29 |
| 2015/0149888 A1 * | 5/2015 | Rice ....................... | G06F 16/972 715/234 |
| 2015/0212992 A1 * | 7/2015 | Anderson ............. | G06F 16/958 715/234 |
| 2017/0337163 A1 * | 11/2017 | Burkard .............. | G06F 16/9574 |
| 2018/0144133 A1 | 5/2018 | Hoover et al. | |
| 2018/0181675 A1 * | 6/2018 | Lavi ..................... | G06F 16/9577 |

* cited by examiner

*Primary Examiner* — Stephen S Hong
*Assistant Examiner* — Ahamed I Nazar
(74) *Attorney, Agent, or Firm* — Moser Taboada

(57) ABSTRACT

A system and method for rendering of dynamic webpage content with no flicker or flash of original content that allows for a guaranteed page rendering time, even where some dynamic content on the page has not been fully updated prior to the initial rendering of the webpage.

15 Claims, 14 Drawing Sheets

SYSTEM AND METHOD FOR DYNAMIC WEBPAGE RENDERING WITH NO FLICKER OR FLASH OF ORIGINAL CONTENT

CROSS-REFERENCE TO RELATED APPLICATIONS

None.

BACKGROUND OF THE INVENTION

Field of the Art

The disclosure relates to the field of dynamic webpage content display, more specifically to the field of rendering webpages without flicker or flash of original content.

Discussion of the State of the Art

In website design and development, users frequently view web pages that are rendered through the use of some combination of Hyper Text Markup Language ("HTML"), Cascade Style Sheets ("CSS"), Javascript ("JS"), and sometimes other technologies, to provide properly formatted and stylized content. Some web pages are static and unchanging, making no calls to databases or applications or running any logic but merely providing the proper formatting for the same content every time a user views the page, while some contain dynamic elements, utilizing programming logic, applications, database calls and functionality, on-page interaction such as buttons, or any combination of these or other such features.

However, in the course of the use of these dynamic features for webpage and website development, a user may see a flicker or flash of original content—an actual visually perceptible change of the webpage they're trying to load—as the webpage struggles to load both its static content, and then updated dynamic content that is not rendered at the same time as the initial webpage resource rendering. This presents an aesthetically unpleasing and disruptive experience for the user, and may have unintended or unacceptable business consequences for the webpage content provider. Some solutions include stalling the rendering and displaying of a webpage until dynamic features and content modifications are finished loading, which may take several seconds, or even time out completely, resulting in poor user experience and negative business outcomes.

SUMMARY OF THE INVENTION

What is needed is a system and method for rendering of dynamic webpage content with no flicker or flash of original content that also avoids stalling and timeout problems inherent in current methodologies.

Accordingly, the inventor has conceived and reduced to practice, in a preferred embodiment of the invention, a system and method for rendering of dynamic webpage content with no flicker or flash of original content that allows for a guaranteed page rendering time, even where some dynamic content on the page has not been fully updated prior to the initial rendering of the webpage. The following non-limiting summary of the invention is provided for clarity, and should be construed consistently with embodiments described in the detailed description below.

According to a preferred embodiment, a system for rendering of dynamic webpage content with no flicker or flash of original content is disclosed, comprising: a web browser script operating on a web browser comprising a first plurality of programming instructions stored in a memory of, and operating on a processor of, a first networked computer, wherein the first plurality of programming instructions, when operating on the processor of the first networked computer, cause the first networked computer to: receive annotated content and resources for rendering of a webpage from a first party content provider; request complete modification rules from a third party content provider; receive incomplete modification rules for rendering of the dynamically modifiable elements of the annotated content from the third party content provider; render the webpage using the incomplete modification rules; request and receive asynchronous transmission of the complete modification rules from the third party content provider; and render the webpage using the complete modification rules; and a gateway comprising a second plurality of programming instructions stored in a memory of, and operating on a processor of, a second networked computer, wherein the second plurality of programming instructions, when operating on the processor of the second networked computer, cause the second networked computer to: detect the request for complete modification rules from the web browser operating the web browser script to the third party content provider; initiate a timer with a limit; when the timer reaches the limit, request incomplete modification rules from the third party content provider, the incomplete modification rules comprising a generated portion of the complete modification rules; transmit the incomplete modification rules to the web browser operating the web browser script.

According to another preferred embodiment, a system for rendering of dynamic webpage content with no flicker or flash of original content is disclosed, comprising: a web browser script operating on a web browser comprising a first plurality of programming instructions stored in a memory of, and operating on a processor of, a networked computer, wherein the first plurality of programming instructions, when operating on the processor of the first networked computer, cause the networked computer to: receive annotated content and resources for rendering of a webpage from a first party content provider; request complete modification rules from a third party content provider; receive incomplete modification rules for rendering of the dynamically modifiable elements of the annotated content from a service worker; render the webpage using the incomplete modification rules; request and receive asynchronous transmission of the complete modification rules from the third party content provider; render the webpage using the complete modification rules; and a service worker comprising a second plurality of programming instructions stored in the memory of, and operating on the processor of, the networked computer, wherein the second plurality of programming instructions, when operating on the processor of the networked computer, cause the networked computer to: detect the request for complete modification rules from the web browser operating the web browser script to the third party content provider; initiate a timer with a limit; when the timer reaches the limit, send to the web browser incomplete modification rules for rendering of the dynamically modifiable elements of the annotated content.

According to another preferred embodiment, a method for rendering of dynamic webpage content with no flicker or flash of original content is disclosed, comprising: receiving annotated content and resources for rendering of a webpage from a first party content provider; requesting complete modification rules from a third party content provider;

detecting the request for complete modification rules; initiating a timer with a limit; when the timer reaches the limit, using incomplete modification rules to render the dynamically modifiable elements of the annotated content; requesting and receiving asynchronous transmission of the complete modification rules from the third party content provider; rendering the webpage using the complete modification rules.

According to an aspect of an embodiment, fallback content is received by the third party content provider along with the incomplete rules and the incomplete rules comprise instructions for applying the fallback content during the rendering of the webpage.

According to an aspect of an embodiment, the incomplete rules comprise a set of empty rules to unblock rendering of the website.

According to an aspect of an embodiment, the incomplete rules are accompanied by cached content for rendering of the website.

According to an aspect of an embodiment, fallback content for rendering of the website is generated when the timer reached the limit.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
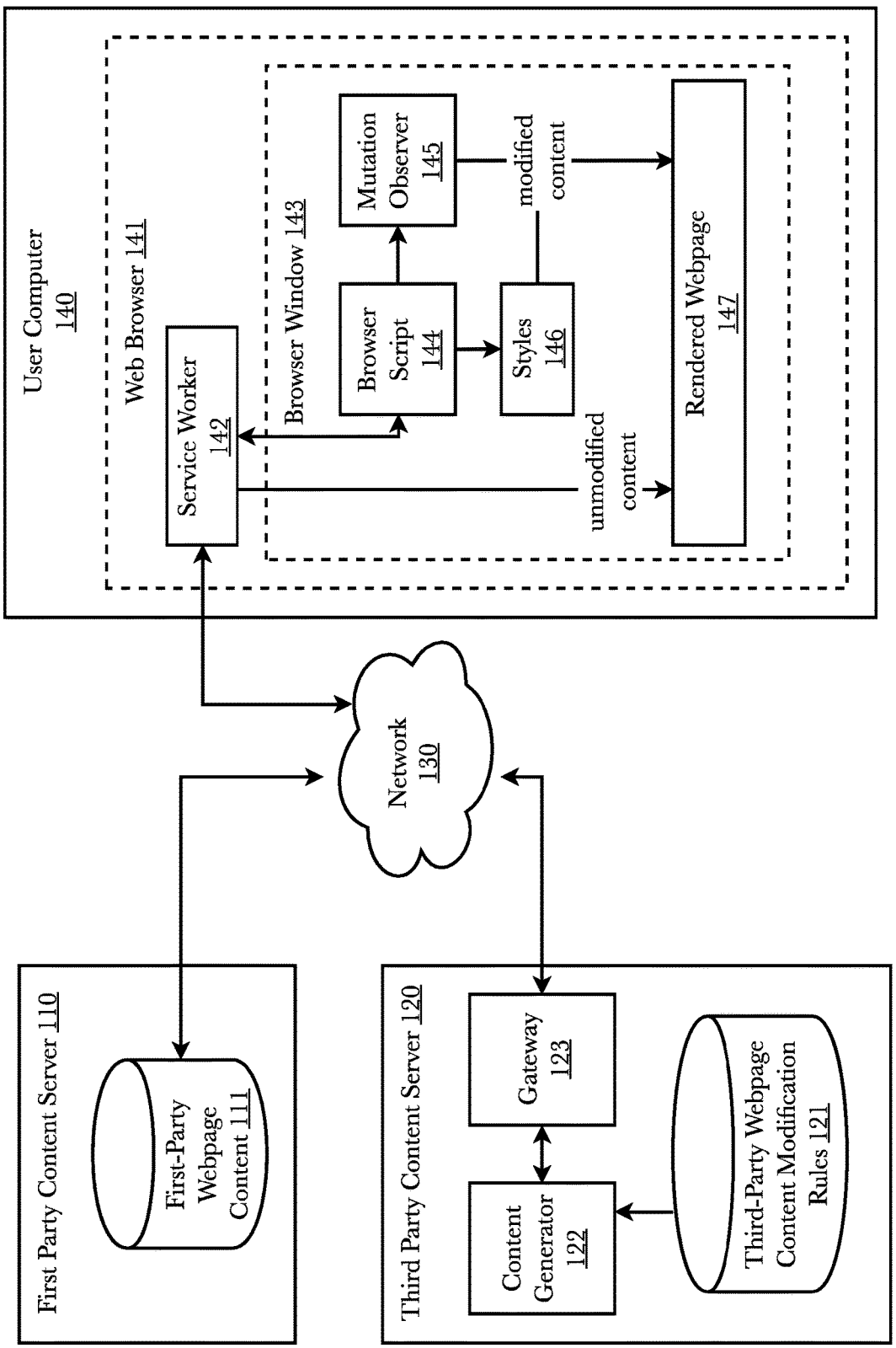
FIG. 1 is a block diagram showing an exemplary system architecture of a system for rendering of dynamic webpage content with no flicker or flash of original content and a guaranteed rendering time.

The inventor has conceived, and reduced to practice, a system and method for rendering of dynamic webpage content with no flicker or flash of original content that allows for a guaranteed page rendering time, even where some dynamic content on the page has not been fully updated prior to the initial rendering of the webpage.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Annotated content" as used herein means the content of a webpage annotated by any markup language to indicate the style, formatting, and content of a webpage.

"Content" as used herein means the content of any webpage.

"Element" as used herein means a discrete item or portion of any webpage content.

"Flicker" as used herein means a visually perceptible change in the size, formatting, or layout of a webpage as dynamic webpage content is updated on the webpage after the initial render of the page in a web browser. An example of flicker is when a webpage is initially rendered without images, and some of the initially-rendered content of the webpage shifts downward as images are dynamically inserted during an update.

"Flash of original content" as used herein means visually perceptible display of a first content of one or more elements of a webpage which then changes to a display of a different content as dynamic webpage content is updated on the webpage after the initial render of the page in a web browser. An example of flash of original content is when a webpage element is initially rendered in one color, and the color of that element changes as the webpage element is dynamically updated. Flash of original content often occurs during A/B testing, wherein the owner of a webpage wants to test the impact of two different versions of a website by showing one set of customers the A version and another set of customers the B version, and measuring the customer response rate for each.

"Markup language" as used herein means any annotation standard for annotating webpage content including, but not limited to, HyperText Markup Language (HTML), Standard Generalized Markup Language (SGML), Extensible Markup Language (XML), and all prior, current, and future versions thereof.

"Script" as used herein means a set of instructions for automating a task on a computer. While there are many types of scripts (e.g., shell scripts, macros, browser scripts, etc.) an important category of scripts are those which enable dynamic functionality in rendering of webpages (e.g., JavaScript). Scripts may be embedded in annotated content.

Conceptual Architecture

FIG. 1 is a block diagram showing an exemplary system architecture of a system for rendering of dynamic webpage content with no flicker or flash of original content and a guaranteed rendering time. A first party content server 110 containing first party webpage content is connected over a network 130, which in most cases will be the Internet. A user computer 140 runs a web browser 141, which is an application designed to fetch and render webpages, in this example from the first party content server 110. The web browser 141 comprises a service worker 142, which is a small program running separately from the main web browser thread that both acts as an interface to the third party content server 120 and adds functionality to the web browser 141 such as timing of requests for, and receipt of, webpage content from the first party content server 110 or modification rules from the third party content server 120, and the ability to unblock rendering of the webpage and/or provide incomplete content for rendering in the event of delays or timeouts. In this embodiment, the system is configured such that all browser communications associated with the webpage at issue pass through the service worker 142, which may then determine what actions to take, if any. The web browser 141 further comprises a browser window which displays the rendered webpage 147, and may have one or more browser scripts 144, which direct the updating of dynamically-modifiable content on the webpage. One action that may browser script 144 perform is registration of mutation observer 145, which notices any change in the DOM (Document Object Model) of browser window 143, and performs any change as prescribed by modification rules provided by browser script 144. The browser script 144 may modify any content on the page according to the modification rules received, including but not limited to page styles 146 such as fonts, colors, and formatting. A third party content server 120, also connected via the network 130, contains a database of third party webpage content modification rules, which are the rules by which the first party webpage content may be dynamically modified. This is usually done at the request of the owner of the first party webpage content 111, wherein the operator of the third party content server 120 is contracted to manage the first party webpage content 111 and its modification. In this embodiment, the third party content server 120 further comprises a content generator 122, whose purpose is to receive requests for modification rules from a web browser 141, retrieve the appropriate rules from the third party webpage content modification rules database 121, and generate a list of applicable rules to be applied to modify the content received by the web browser 141 from the first party content server 110. The gateway 123 is a server-side component corresponding to the service worker 142 in the web browser 141. The gateway is responsible for acting as an interface to the web browser 142 and adds functionality such as timing of requests for, and delivery of, webpage content from the first party content server 110 or modification rules from the third party content server 120, and the ability to unblock rendering of the webpage and/or provide incomplete modification rules for rendering in the event of delays or timeouts. In this embodiment, the system is configured such that all third party content server 120 communications associated with the webpage at issue pass through the gateway 123, which may then determine what actions to take, if any. In some embodiments, content generator may take over some or all functions of gateway 123, allowing third-party content generator 120 to be implemented without gateway.

DETAILED DESCRIPTION OF EXEMPLARY ASPECTS

Figure 2:
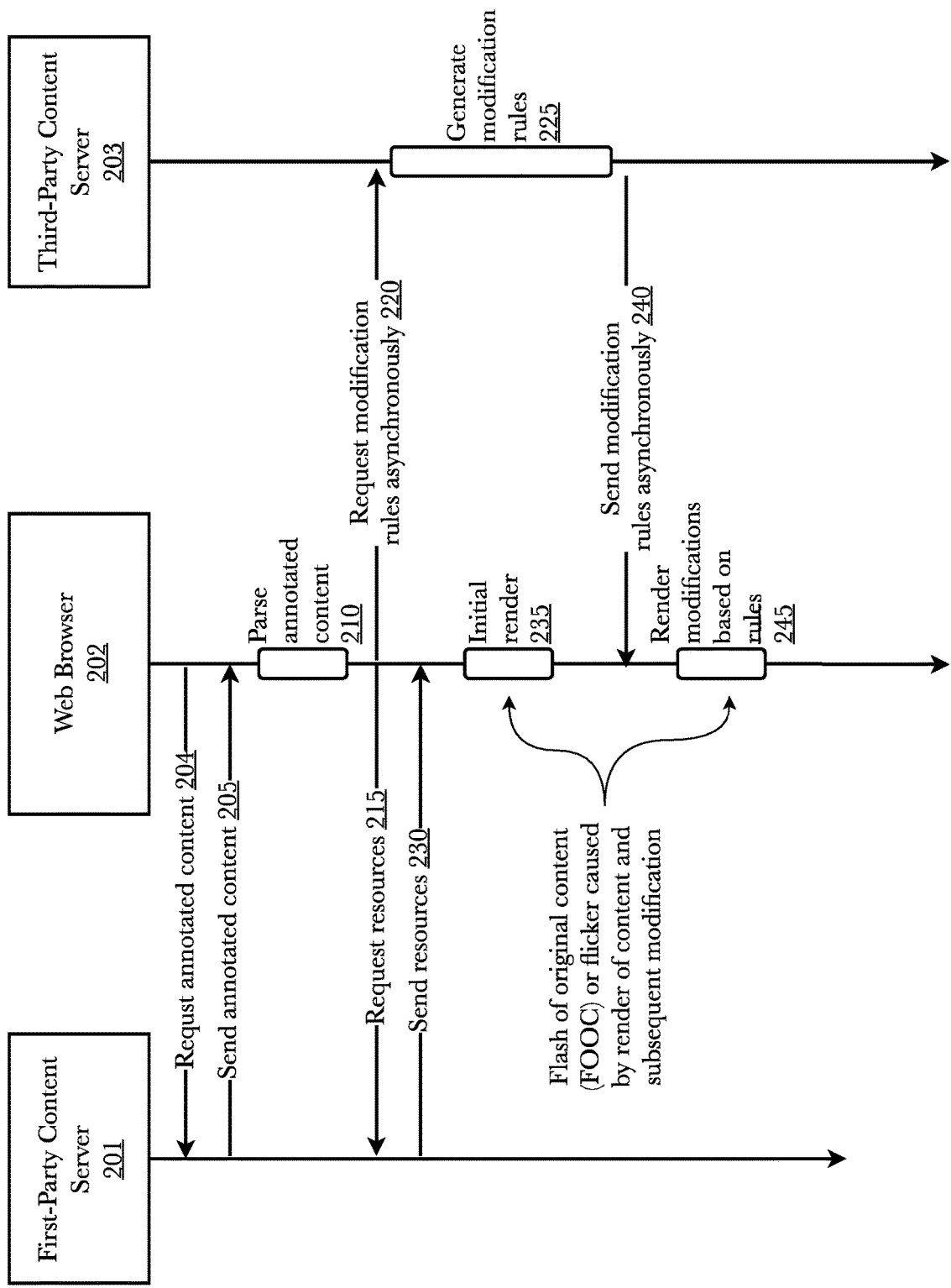
FIG. 2 (PRIOR ART) is a message flow diagram illustrating a problem with the current methodology for web page rendering which causes a flash of original content.

FIG. 2 (PRIOR ART) is a message flow diagram illustrating a problem with the current methodology for web page rendering which causes a flash of original content. The web browser 202 of the user computer requests the annotated content 204 for the webpage from the first party content server 201, which responds by providing the annotated content 205. The annotated content is parsed 210 to determine what resources are needed for rendering of the page, and the web browser 202 sends a request for those resources 215 to the first party content server 201. The resources may include any information necessary to render the webpage including, but not limited to, image files, JavaScript (JS) instructions, cascading style sheet (CSS) descriptions, etc., and may also contain original and alternate content such as different versions of an element of content for use in A/B testing. Simultaneously, the web browser 202, following instructions in a script contained in the header of the annotated content, requests that modification rules for dynamically-modifiable content be sent 220 from the third party content server 203 asynchronously. When the requested resources are sent 230 by the first party content server, the web browser may then perform the initial rendering of the webpage 235. However, in many cases, this initial rendering 235 may be performed prior to receiving the modification rules from the third party content server 203, thus showing incomplete content or non-updated original content. After request for modification rules 220, the third party content server 203 generates the modification rules for dynamically-modifiable content on the webpage 225, and sends the modification rules 240 to the web browser 202 asynchronously. If these modification rules are received by the web browser 202 after the initial rendering of the webpage 235, the user may first see flicker or flash of original content as the dynamically-modifiable elements of webpage content are updated pursuant to the modification rules 245.

Figure 3:
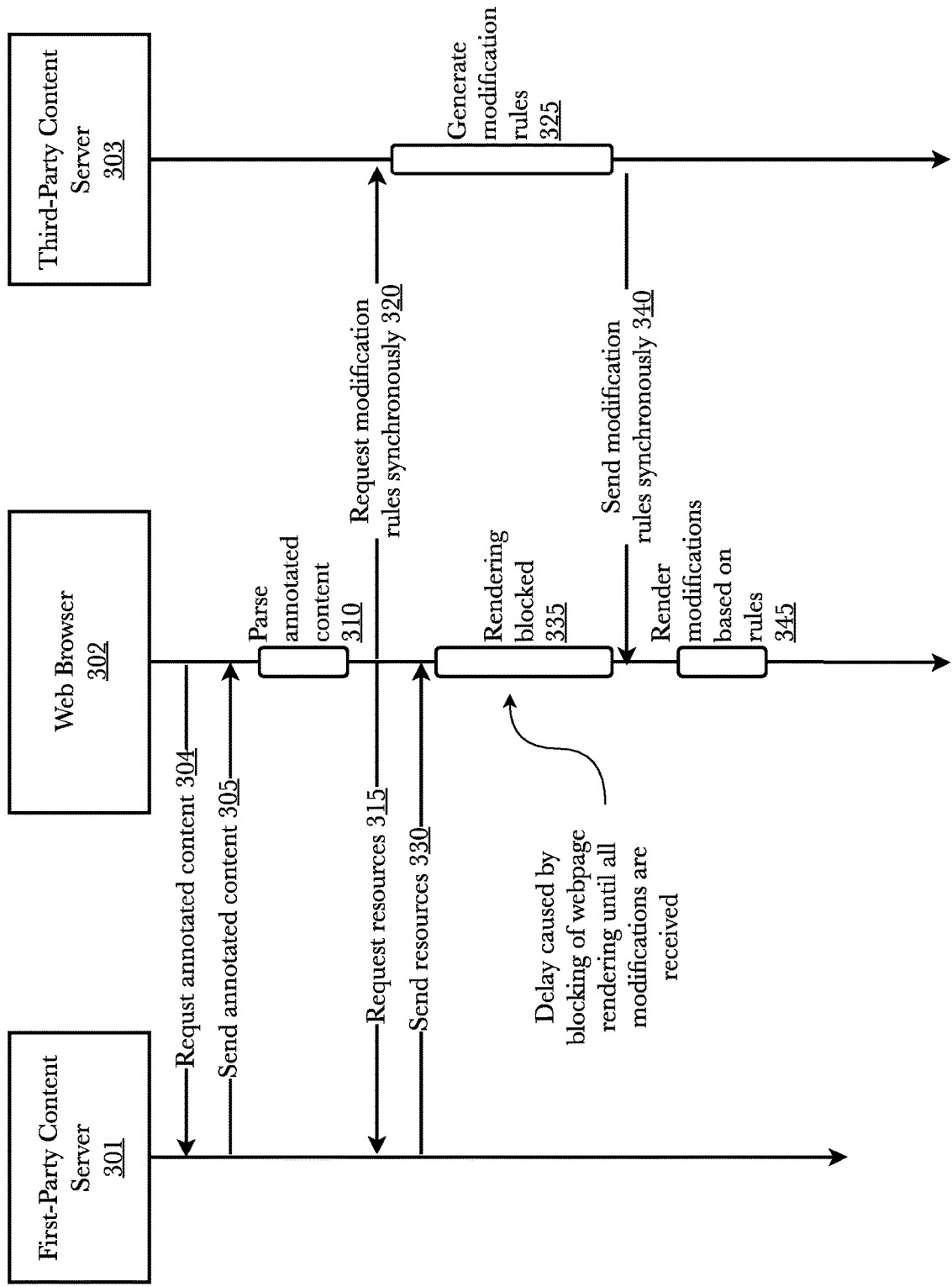
FIG. 3 (PRIOR ART) is a message flow diagram illustrating a problem with the current methodology of avoiding flashes of original content which delays the rendering of the web page.

FIG. 3 (PRIOR ART) is a message flow diagram illustrating a problem with the current methodology of avoiding flashes of original content which delays the rendering of the web page. As in the prior example, the web browser 302 of the user computer requests the annotated content 304 for the webpage from the first party content server 301, which responds by providing the annotated content 305. The annotated content is parsed 310 to determine what resources are needed for rendering of the page, and the web browser 302 sends a request for those resources 315 to the first party content server 301. The resources may include any information necessary to render the webpage including, but not limited to, image files, JavaScript (JS) instructions, cascading style sheet (CSS) descriptions, etc., and may also contain original and alternate content such as different versions of an element of content for use in A/B testing. Simultaneously, the web browser 302, following instructions in a script contained in the header of the annotated content, requests that modification rules for dynamically-modifiable content be sent 320 from the third party content server 203. This time, however, the request 320 is made for the modification rules to be sent synchronously, causing rendering of the webpage to be blocked 335 until the modification rules are received from the third party content server 303. When the requested resources are sent 330 by the first party content server, the web browser is blocked from rendering of the webpage 335 which is waiting for third party content server 303 to generate the modification rules for dynamically-modifiable content on the webpage 325, and to send the modification rules 340 to the web browser 302 synchronously. When the modification rules are received by the web browser 302, the rendering of the webpage is unblocked and the initial rendering of the webpage occurs inclusive of changes to dynamically-modifiable elements of content based on the modification rules 345. This method prevents flicker or flash of original content, but often causes uncontrolled and unacceptable delays in rendering content or even timeouts and failures to render the webpage. For example, if the third party content server 303 is slow to respond, rendering of the content may be delayed for several seconds or, if the connection with the third party content server 303 is lost, a timeout may occur and the webpage will fail to render at all.

Figure 4:
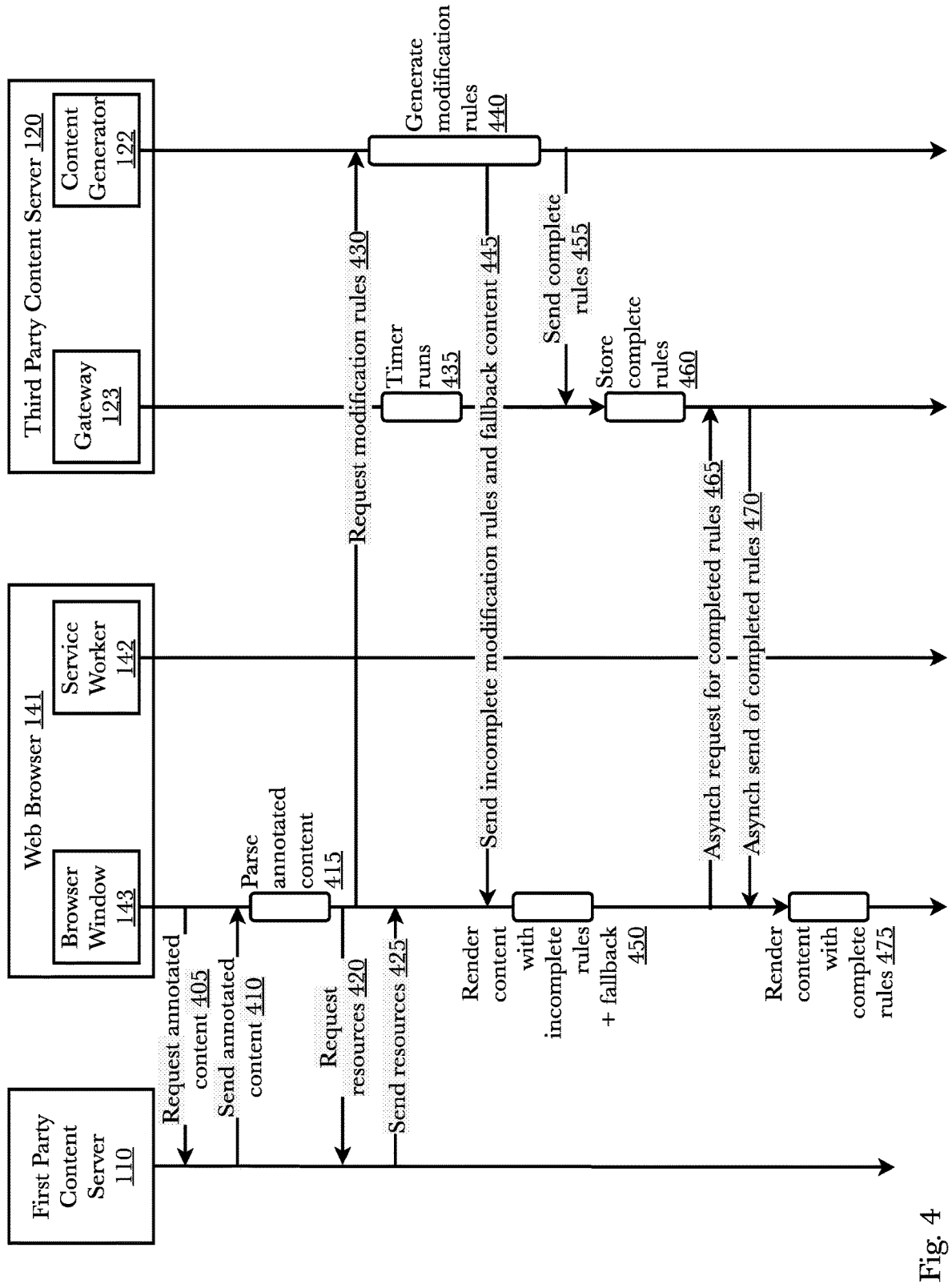
FIG. 4 is a message flow diagram illustrating an implementation of the operation of an exemplary embodiment of a system for rendering of dynamic webpage content with no flicker or flash of original content in which the gateway operates a timer guaranteeing a webpage rendering time.

FIG. 4 is a message flow diagram illustrating an implementation of the operation of an exemplary embodiment of a system for rendering of dynamic webpage content with no flicker or flash of original content in which the gateway operates a timer guaranteeing a webpage rendering time. The browser window 143 of the web browser 141 of the user computer 140 requests the annotated content 405 for the webpage from the first party content server 110, which responds by providing the annotated content 410. The annotated content is parsed 415 to determine what resources are needed for rendering of the page, and the browser window 143 sends a request for those resources 420 to the first party content server 110. The resources may include any information necessary to render the webpage including, but not limited to, image files, JavaScript (JS) instructions, cascading style sheet (CSS) descriptions, etc., and may also contain original and alternate content such as different versions of an element of content for use in A/B testing. Simultaneously, the browser window 143, following instructions in a script contained in the header of the annotated content, requests that modification rules for dynamically-modifiable content be sent 430 from the third party content server 120. This request passes through the gateway 123, which immediately starts a timer 435, and is received by the content generator 122, which starts to generate the modification rules 440. During this period, resources may be sent 425 by the first party content server 110 for rendering the webpage, but are not rendered until either the timer runs out 435 or the modification rules are generated 440, whichever occurs first. If the modification rules are generated 440 prior to the expiration of the timer, they are sent to the browser window, and the entire webpage is rendered inclusive of changes to dynamically-modifiable elements of content based on the modification rules (not shown). If, however, the timer 435 runs out before the modification rules are generated 440, the gateway prompts the content generator 122 to immediately send incomplete modification rules 445 comprising the modification rules that have been generated up until the moment the timer 435 expired, plus fallback content to be rendered for dynamically-modifiable elements of webpage content where the modification rules for those elements have not yet been generated. The incomplete rules may comprise empty content, incomplete rules and fallback content received from the content generator (as in the prior example), or locally-cached content from prior renderings of this webpage or related webpages, or any combination of the above. The browser window renders the webpage content inclusive of incomplete modification rules and fallback content 450.

The fallback content is created and stored in advance in the third party webpage content modification rules database 121, and designed such that the fallback content will for instance create placeholders for dynamically-modifiable content such that there is no flicker and little or no visually perceptible flash of original content. For example, where a dynamically modifiable element of webpage content is an image, a placeholder for that image of the same size as the final, modified image may be rendered, with the color of the placeholder image matching the background color of the webpage. Thus, flicker will be prevented by including an image placeholder in the initial render which is the same size as the known size of the final image. Flash of original content is prevented from the resources received 425 because the original content received as a resource 425 for that image from the first party content server 110 is not displayed (preventing, for example, an incorrect color from being inadvertently rendered). In some cases, the placeholder may be visually perceptible to the user (for example, if the image is grayscale illustration evoking in user perception of the content which is yet to be displayed unobtrusively), but in other cases the placeholder will not be visually perceptible to the user (for example, if it matches the background color of the webpage).

While the rendering of incomplete and fallback content is in process, the generation of modification rules 440 is completed, and the complete rules are sent to the gateway 455, which then stores the complete rules 460 pending request by the browser window 143. Once the rendering with incomplete and fallback content 450 is completed, the browser window sends a request for the complete rules to be sent asynchronously 465, and the gateway 123 responds by sending the completed rules 470. The browser window 143 then renders the webpage with the complete content including the complete rules for changing dynamically-modifiable content 475. Note that in some embodiments, the sequence of events may differ. For example, the request to send completed rules asynchronously 465 may occur immediately upon receipt of the incomplete modification rules and fallback content 445.

As an example of timing, a client may determine that the maximum acceptable delay for rendering a webpage is 500 milliseconds (ms). If the modification rules are generated 440 and sent within 500 ms from the request for modification rules 430, the webpage renders with the complete content. If, however, more than 500 ms elapses between the request for modification rules 430 and the generation and sending of the modification rules 440 (meaning that the gateway timer 435 has expired), the process for rendering with incomplete rules and fallback content occurs. In some embodiments, separate timers may be applied to modification rules for individual elements of webpage content or to groups of elements of webpage content instead of to the modification rules for the entire webpage.

Figure 5:
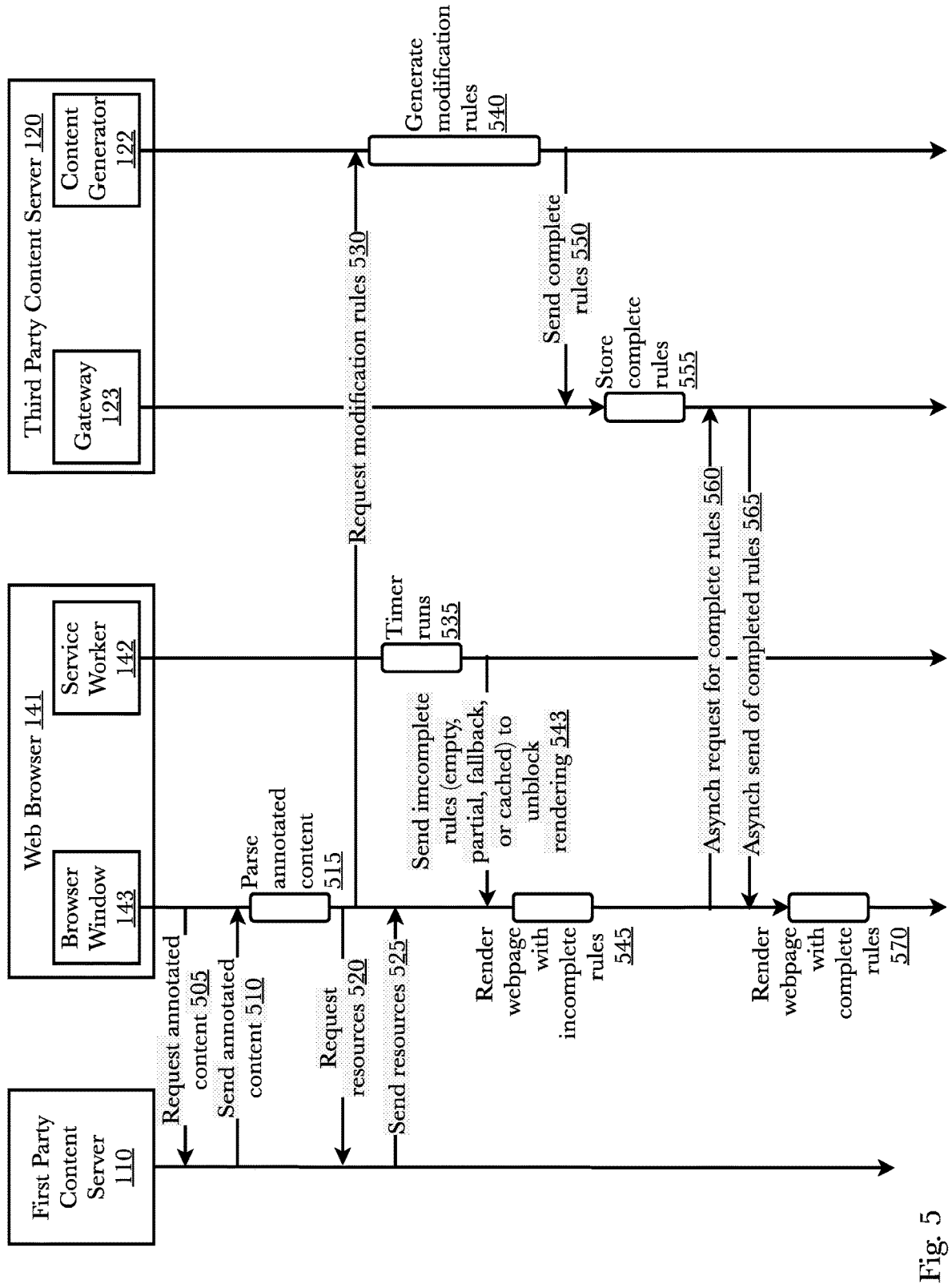
FIG. 5 is a message flow diagram illustrating another implementation of the operation of an exemplary embodiment of a system for rendering of dynamic webpage content with no flicker or flash of original content in which the service worker operates a timer guaranteeing a webpage rendering time.

FIG. 5 is a message flow diagram illustrating another implementation of the operation of an exemplary embodiment of a system for rendering of dynamic webpage content with no flicker or flash of original content in which the service worker operates a timer guaranteeing a webpage rendering time. The browser window 143 of the web browser 141 of the user computer 140 requests the annotated content 505 for the webpage from the first party content server 110, which responds by providing the annotated content 510. The annotated content is parsed 515 to determine what resources are needed for rendering of the page, and the browser window 143 sends a request for those resources 520 to the first party content server 110. The resources may include any information necessary to render the webpage including, but not limited to, image files, JavaScript (JS) instructions, cascading style sheet (CSS) descriptions, etc., and may also contain original and alternate content such as different versions of an element of content for use in A/B testing. Simultaneously, the browser window 143, following instructions in a script contained in the header of the annotated content, requests that modification rules for dynamically-modifiable content be sent 530 from the third party content server 120. This request passes through the service worker 142, which immediately starts a timer 535. The request is received by the content generator 122, which starts to generate the modification rules 540. During this period, resources may be sent 525 by the first party content server 110 for rendering the webpage, but are not rendered until either the timer runs out 535 or the modification rules are generated 540, whichever occurs first. If the modification rules are generated 540 prior to the expiration of the timer, they are sent to the browser window 143, and the entire webpage is rendered inclusive of changes to dynamically-modifiable elements of content based on the modification rules (not shown). If, however, the timer 535 runs out before the modification rules are generated 540, the service worker 142 immediately sends incomplete rules 543 to the browser window 143 to unblock rendering.

The incomplete rules may comprise empty content, incomplete rules and fallback content received from the content generator (as in the prior example), or locally-cached content from prior renderings of this webpage or related webpages, or any combination of the above. In some embodiments, the service worker 142 may generate its own fallback content based on the annotated content and resources 510, 525 received from the first party content server or any information obtained from prior communication with third-party content server 120 which has been cached or any combination of aforementioned. For example, if the annotated content specifies insertion of an image and the image resource received has a certain size, the service worker 142 may generate fallback content (i.e., a placeholder) for that image by creating a gray image of the same size as the image resource for the browser window to render instead of the image resource. In some cases, the webpage rendering with incomplete rules may be visually perceptible to the user (for example, if a placeholder image is gray instead of the color of the webpage background), but in other cases the webpage rendering with incomplete rules will not be visually perceptible to the user (for example, if it matches the background color of the webpage).

While the rendering of the webpage with incomplete rules 545 is in process, the generation of modification rules 540 is completed, and the complete rules are sent to the gateway 550, which then stores the complete rules 555 pending request by the browser window 143. Once the rendering of incomplete rules 545 is completed, the browser window 143 sends a request for the complete rules to be sent asynchronously 560, and the service worker 143 responds by sending the completed rules 565. The browser window 143 then renders the webpage with the complete content including the complete rules for changing dynamically-modifiable content 570. Note that in come embodiments, the sequence of events may differ. For example, the request to send completed rules asynchronously 560 may occur immediately upon receipt of the incomplete rules 543, or the service worker 142 may send the request for complete rules instead of the browser window.

As an example of timing, a client may determine that the maximum acceptable delay for rendering a webpage is 500 milliseconds (ms). If the modification rules are generated 540 and sent within 500 ms from the request for modification rules 530, the webpage renders with the complete content. If, however, more than 500 ms elapses between the request for modification rules 530 and the generation and sending of the modification rules 540 (meaning that the service worker timer 535 has expired), the process for rendering with incomplete rules occurs. In some embodiments, separate timers may be applied to modification rules for individual elements of webpage content or to groups of elements of webpage content instead of to the modification rules for the entire webpage.

Figure 6:
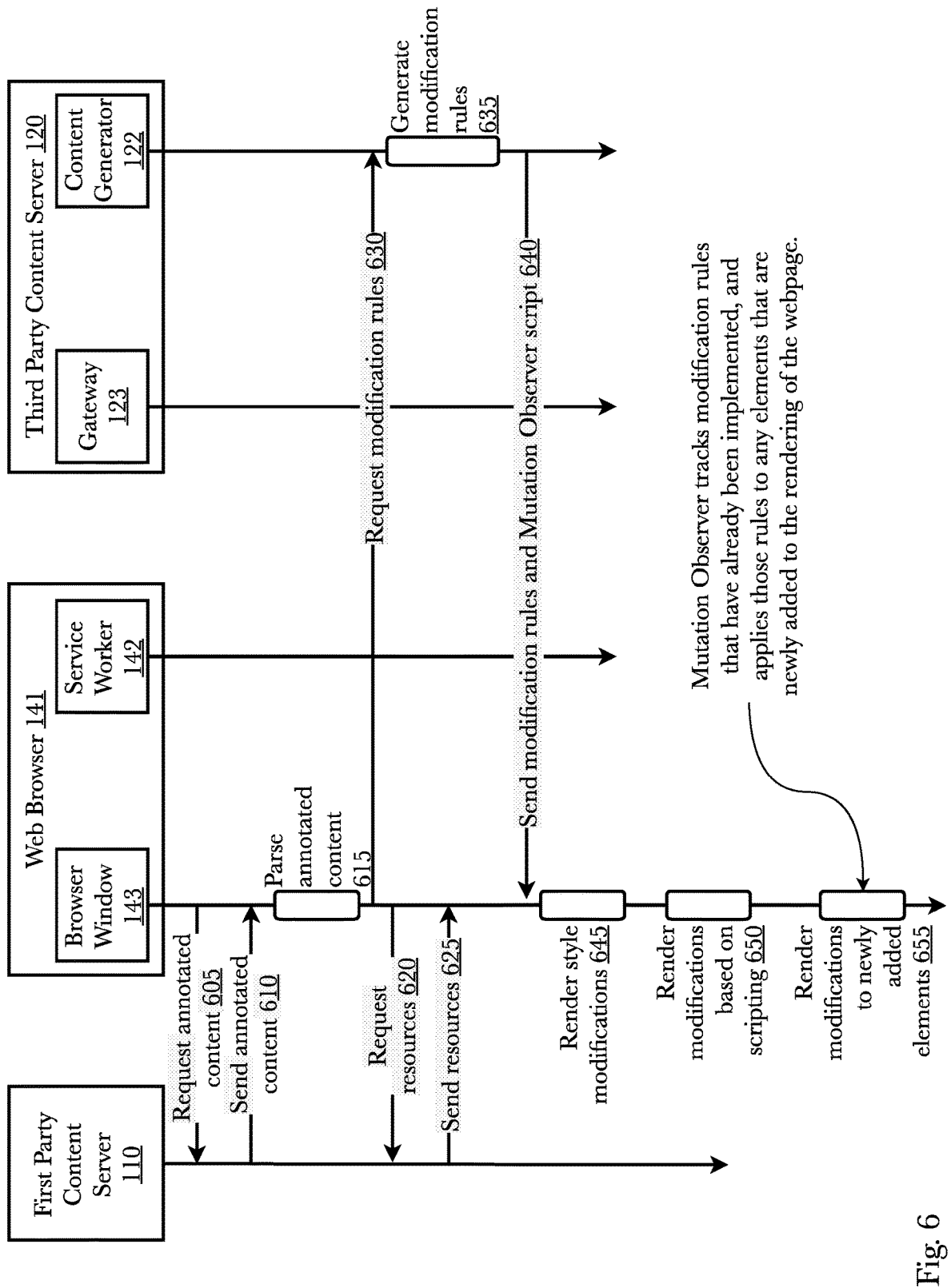
FIG. 6 is a message flow diagram illustrating another implementation of the operation of an exemplary embodiment of a system for rendering of dynamic webpage content with no flicker or flash of original content in which a mutation observer script mutates the content of the page dynamically even after the initial rendering happens by reacting to any dynamic changes of the content.

It will be recognized by a person of ordinary skill in the art that the exemplary aspects shown in FIGS. 5 and 6 are not mutually exclusive, and are not the only possible implementations. For example, it is quite possible for the gateway 123 and the service worker 142 to both run timers (single or multiple) and to take actions independently whenever a timer operated by one of them expires. Alternatively, the gateway 123 and service worker 142 may be configured to coordinate with each other on the action to be taken at the expiration of a given timer, for example, the service worker 142 may determine that sufficient locally-cached information exists to render portions of the webpage, and request rules only for the un-cached portions from the gateway 123.

FIG. 6 is a message flow diagram illustrating another implementation of the operation of an exemplary embodiment of a system for rendering of dynamic webpage content with no flicker or flash of original content in which a mutation observer 145 script mutates the content of the page dynamically even after the initial rendering happens by reacting to any dynamic changes of the content. The browser window 143 of the web browser 141 of the user computer 140 requests the annotated content 605 for the webpage from the first party content server 110, which responds by providing the annotated content 610. The annotated content is parsed 615 to determine what resources are needed for rendering of the page, and the browser window 143 sends a request for those resources 620 to the first party content server 110. The resources may include any information necessary to render the webpage including, but not limited to, image files, JavaScript (JS) instructions, cascading style sheet (CSS) descriptions, etc., and may also contain original and alternate content such as different versions of an element of content for use in A/B testing. Simultaneously, the browser window 143, following instructions in a script contained in the header of the annotated content, requests that modification rules for dynamically-modifiable content be sent 630 from the third party content server 120. The resources are sent 625 by the first party content server 110 for rendering the webpage, but are not rendered until the modification rules are generated 635. In this example, along with the modification rules, the content generator 122 sends a mutation observer script 640. After receiving of the modification rules, the browser window first render style-based modifications 645 which apply to any element matching the style selector of the rule. Then the browser window renders received modifications based on script 650, which may perform any one-off manipulations with the browser window, for instance it may modify inner content of any of the page elements. At the end, mutation observer script is registered in the browser window, which then track any changes to the DOM element, and if any of the changes of the DOM matches the modification rules based on scripting 650, it reapplies them 655. This way the changes based on scripting 650 are not applied only immediately after the modification rules are received, but also for any further changes of the DOM that matches configured rules 655. An example of the such change is when first-party content server content 610 and resources 625 implements a dynamic application which renders the page dynamically based on user interaction—in this case user may interact with the page in a way it renders the content after the rendering modifications based on scripting 650 which wouldn't be without use of mutation observer applied on such dynamic content.

Figure 7:
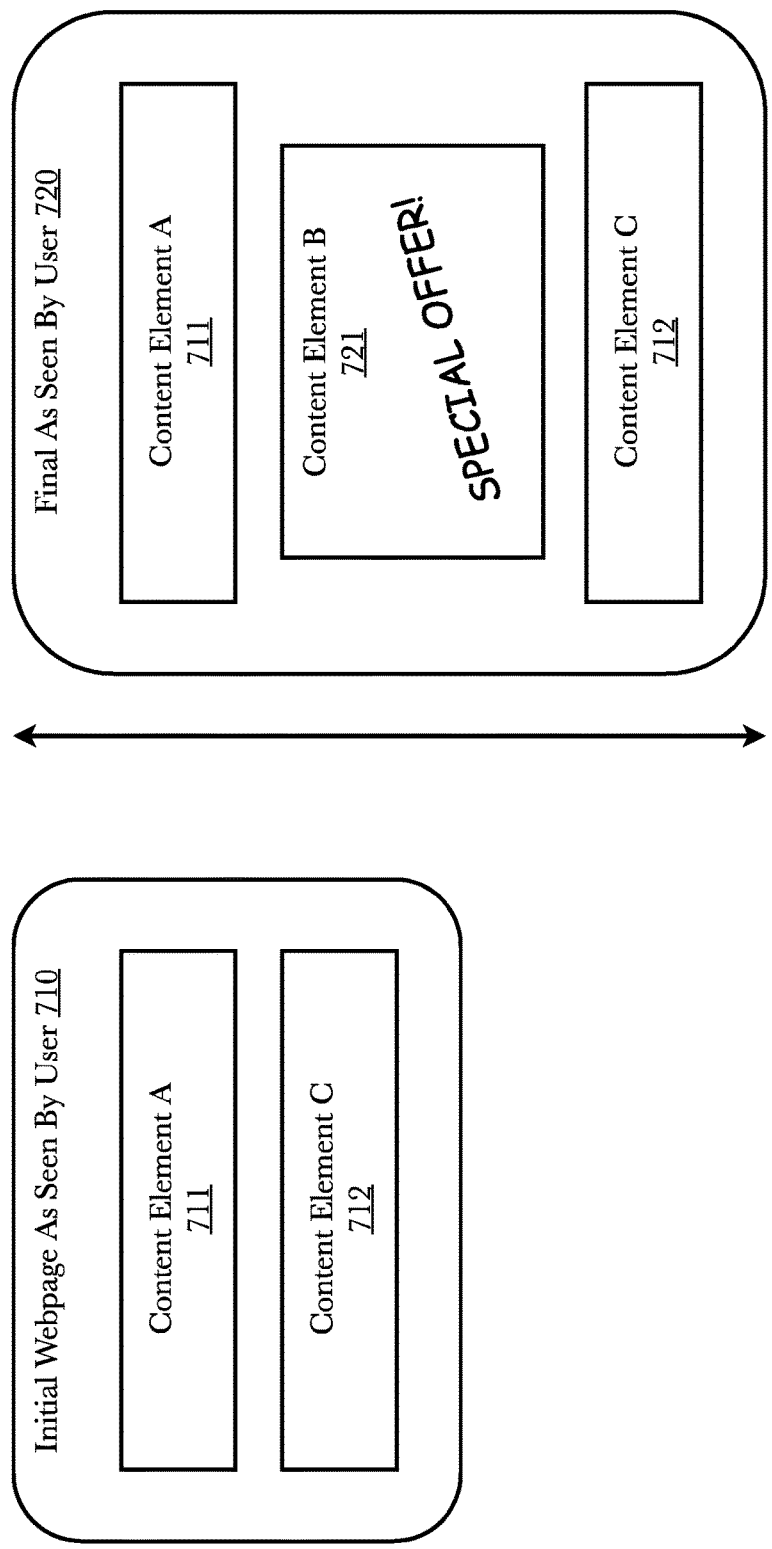
FIG. 7 is an example of flicker caused by modification of dynamically-modifiable elements of webpage content after the initial webpage rendering.

FIG. 7 (PRIOR ART) is an example of flicker caused by modification of dynamically-modifiable elements of webpage content after the initial webpage rendering 700. In a simplified representation of the initial rendering of a webpage shown in 710, two elements of content have been rendered, content element A 711 and content element C 712. However, a delay in receiving modification rules has caused content element B 721, an image, not to be rendered at the same time as content elements A and C 711, 712. Consequently, when content element B 721 is finally rendered as shown in 720, the user perceives flickering of the page due to the insertion of content element B 721 and the shifting of content element C 712 further down the page.

Figure 8:
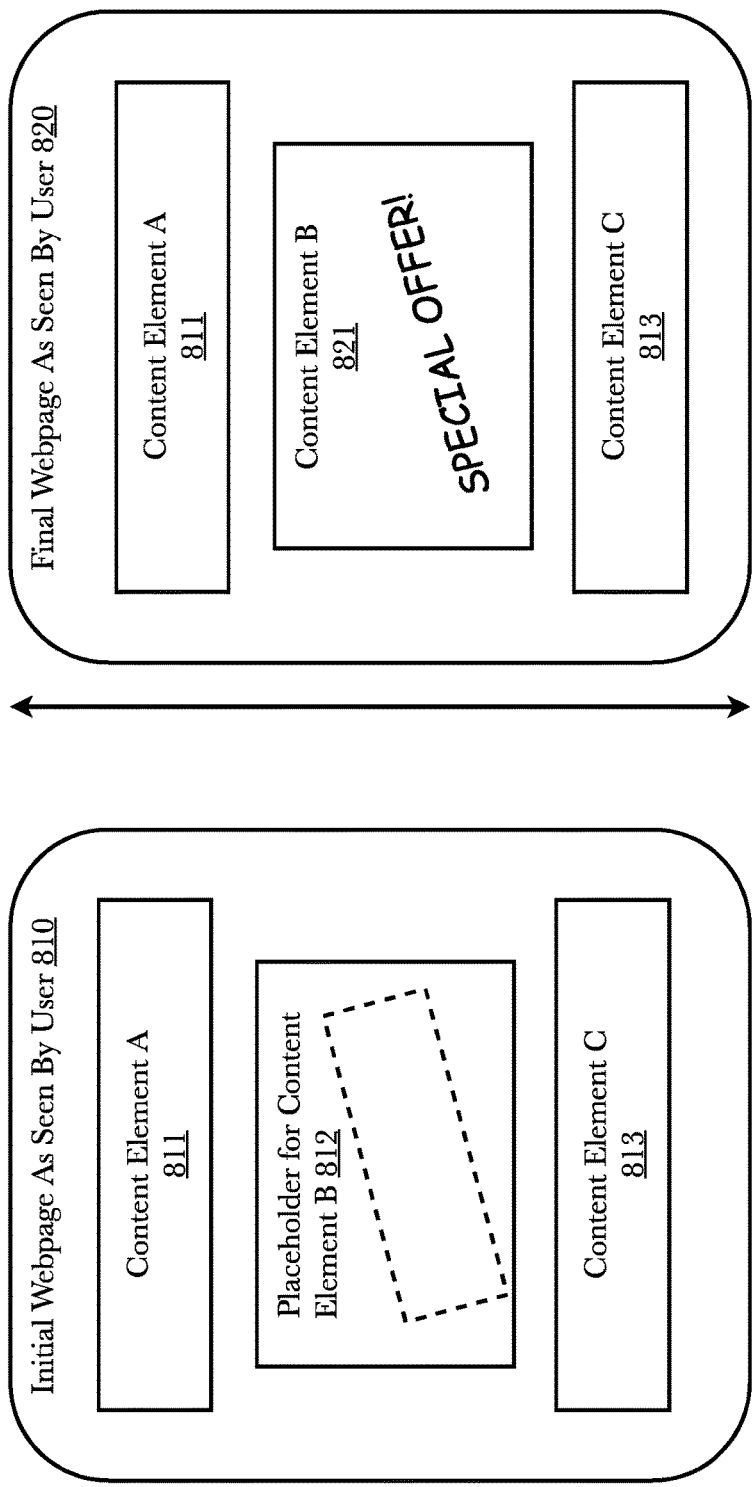
FIG. 8 shows an aspect of a solution for flicker caused by modification of dynamically-modifiable elements of webpage content after the initial webpage rendering.

FIG. 8 shows an aspect of a solution for flicker caused by modification of dynamically-modifiable elements of webpage content after the initial webpage rendering 800. Prevention of flickering may involve inserting a placeholder for any content that may not be properly rendered in the initial rendering of a webpage. In a simplified representation of the initial rendering of a webpage shown in 810, two elements of content have been rendered, content element A 811 and content element C 813. A delay in receiving modification rules has caused content element B 821, an image, not to be rendered at the same time as content elements A and C 811, 813. However, a placeholder for content element B 812 has been inserted of the same size as content element B 821. Thus, when content element B 821 is finally rendered as shown in 820, there is no flickering of the page because content element B 821 simply replaces the placeholder for content element B 812.

Figure 9:
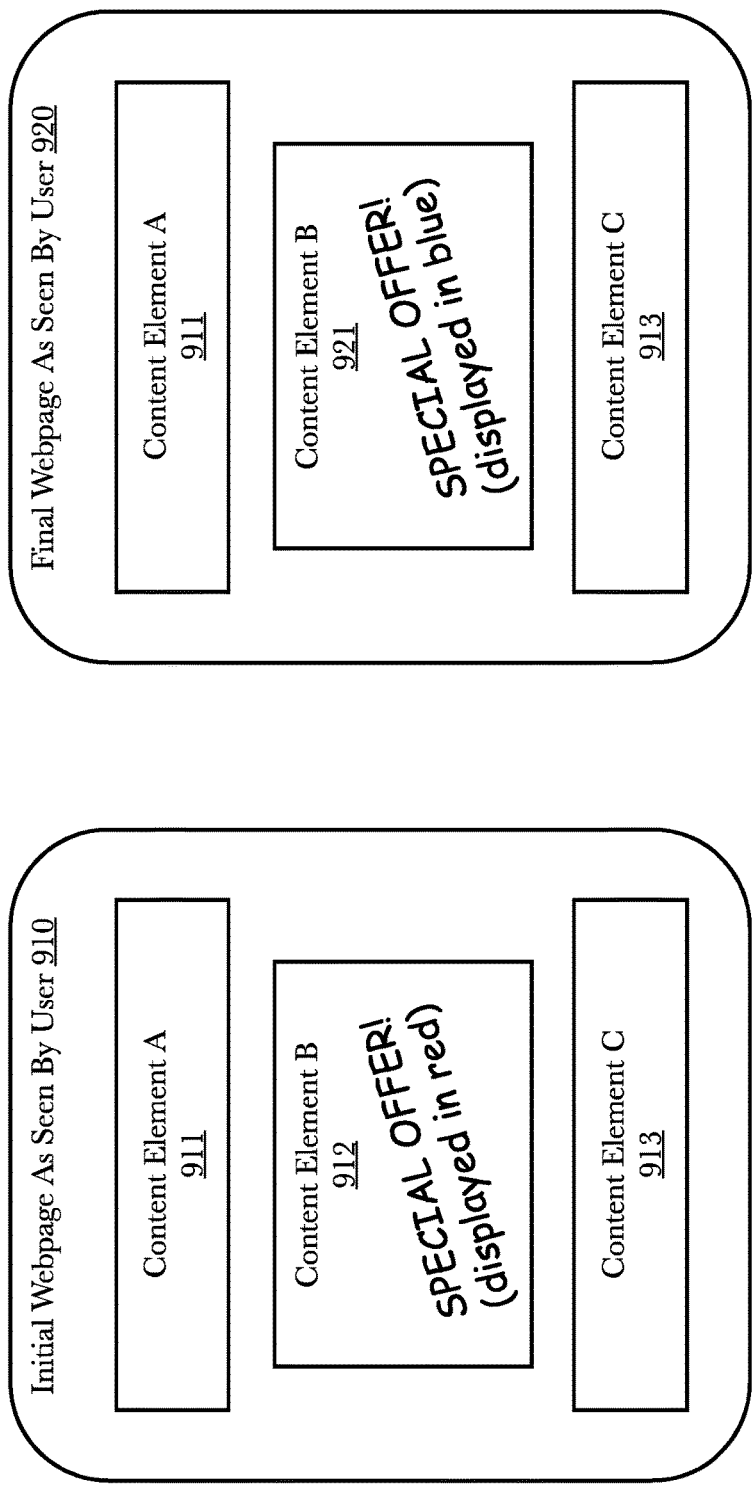
FIG. 9 is an example of flash of original content caused by modification of dynamically-modifiable elements of webpage content after the initial webpage rendering.

FIG. 9 is an example of flash of original content caused by modification of dynamically-modifiable elements of webpage content after the initial webpage rendering 900. In a simplified representation of the initial rendering of a webpage shown in 910, three elements of content have been rendered, content element A 911, content element B 912, and content element C 913. However, content element B 912 is the "A" version of a dynamically-modifiable content element that is for instance being subjected to A/B testing, which is displayed in red color. When the "B" version of content element B 921 is rendered as shown in 920, the user sees a change in color from red to blue that was not intended by, and may be detrimental to, the content provider. At the very least, this flash of original content will corrupt any data obtained from the A/B testing.

Figure 10:
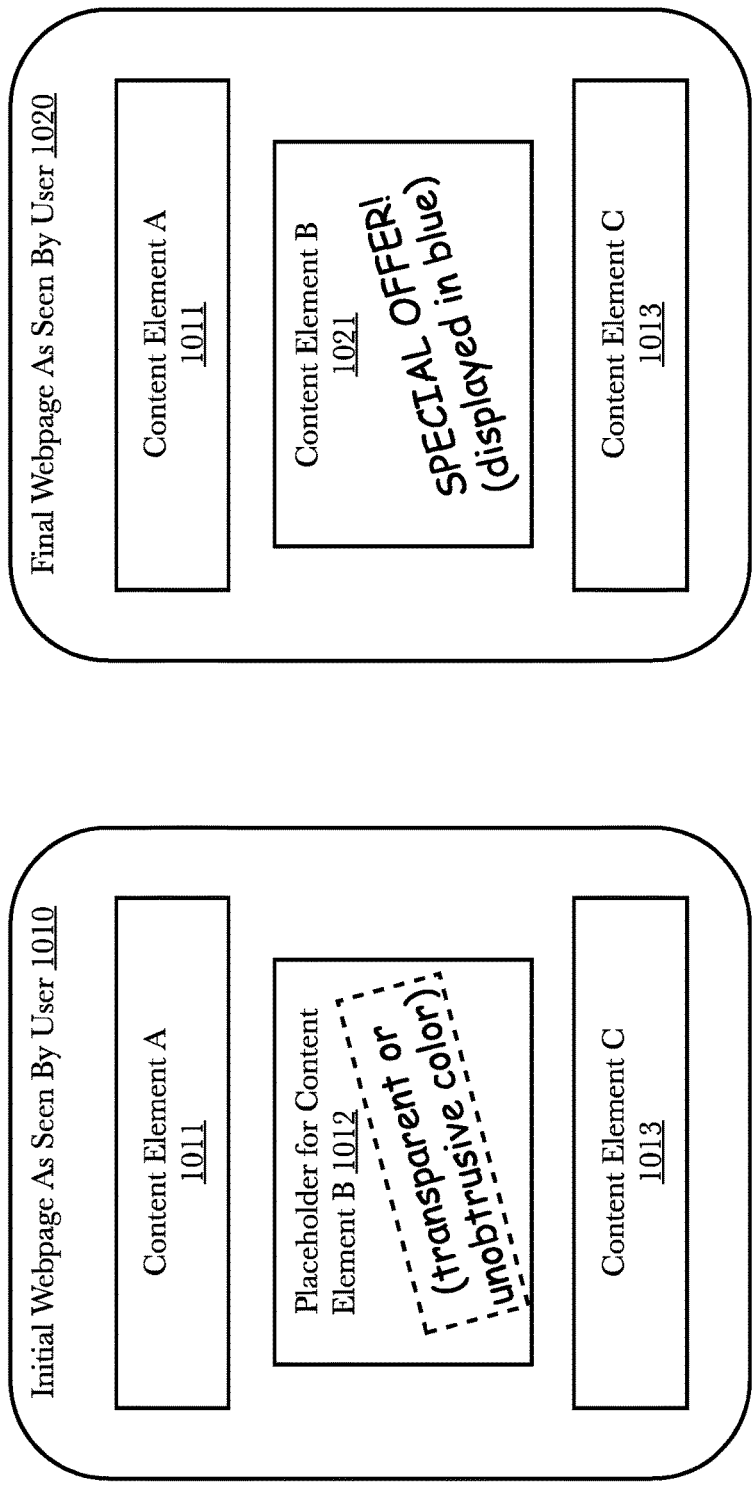
FIG. 10 shows an aspect of a solution for flash of original content caused by modification of dynamically-modifiable elements of webpage content after the initial webpage rendering.

FIG. 10 shows an aspect of a solution for flash of original content caused by modification of dynamically-modifiable elements of webpage content after the initial webpage rendering 1000. Prevention of flash of original content may involve inserting a placeholder for any content that may not be properly rendered in the initial rendering of a webpage. In a simplified representation of the initial rendering of a webpage shown in 1010, three elements of content have been rendered, content element A 1011, a placeholder for content element B 1012, and content element C 1013. The "A" version of a dynamically-modifiable content element that is being subjected to A/B testing is no longer shown, and the placeholder for content element 2 1012 is shown, instead. The placeholder for content element 2 1012 may be shown in a way that is either imperceptible to the user or is unobtrusive, such as being transparent, or shown with a color matching the background color, or shown with an unobtrusive gray color (indicating that it is a placeholder, for example), etc. When the "B" version of content element B 1021 is rendered as shown in 1020, the user either does not see a change in color or sees only a minimal change because the placeholder for content element B 1012 was rendered instead of the "A" version of content element B (not shown).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
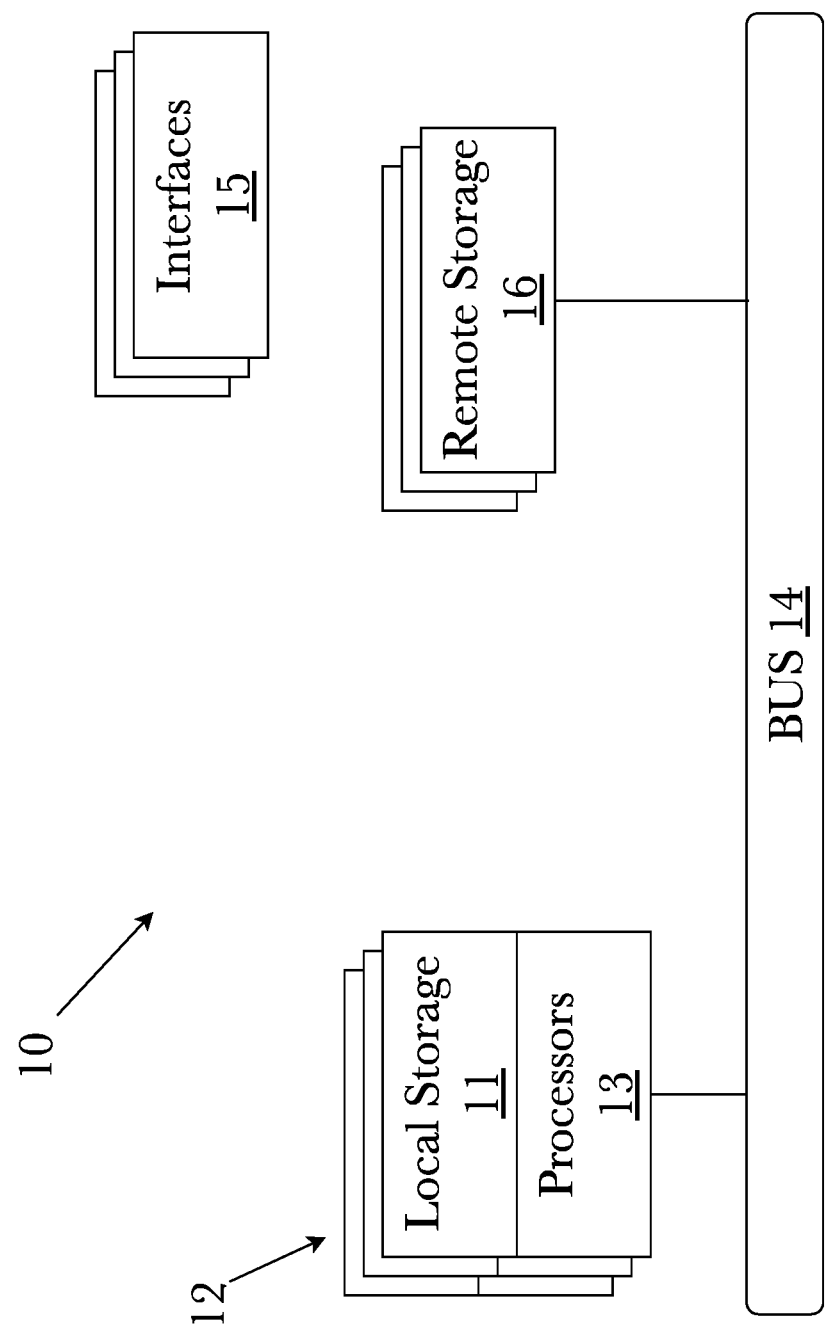
FIG. 11 is a block diagram illustrating an exemplary hardware architecture of a computing device.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
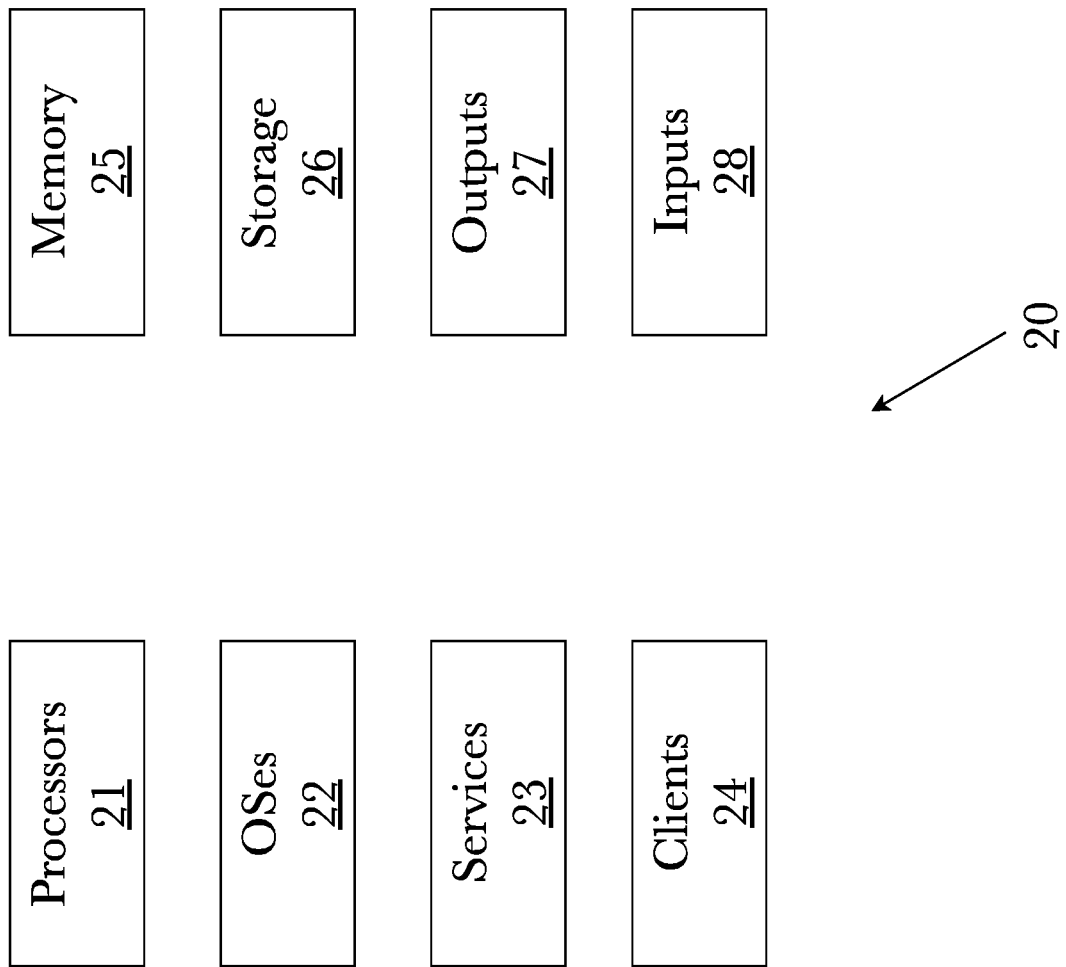
FIG. 12 is a block diagram illustrating an exemplary logical architecture for a client device.

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
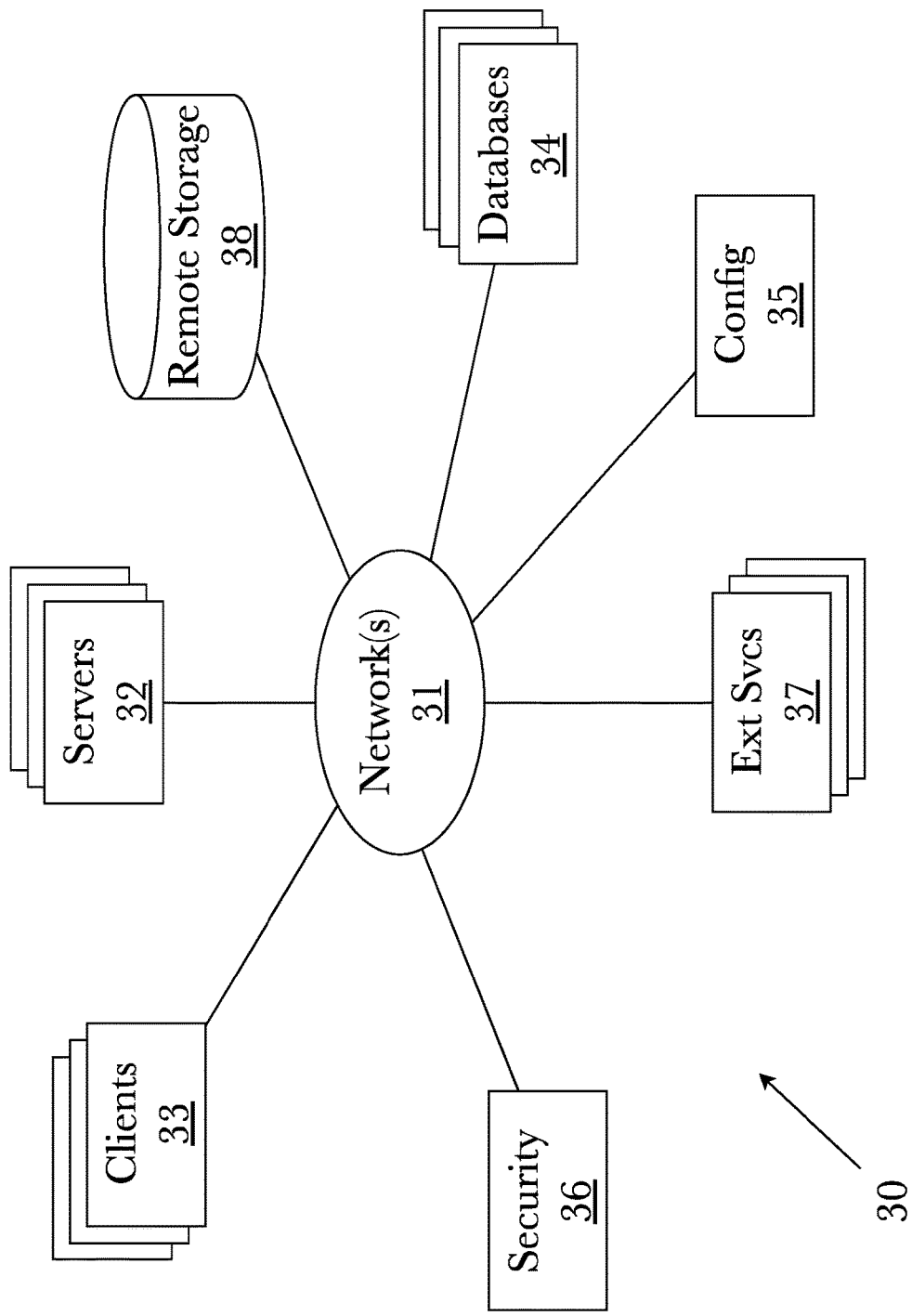
FIG. 13 is a block diagram showing an exemplary architectural arrangement of clients, servers, and external services.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 14:
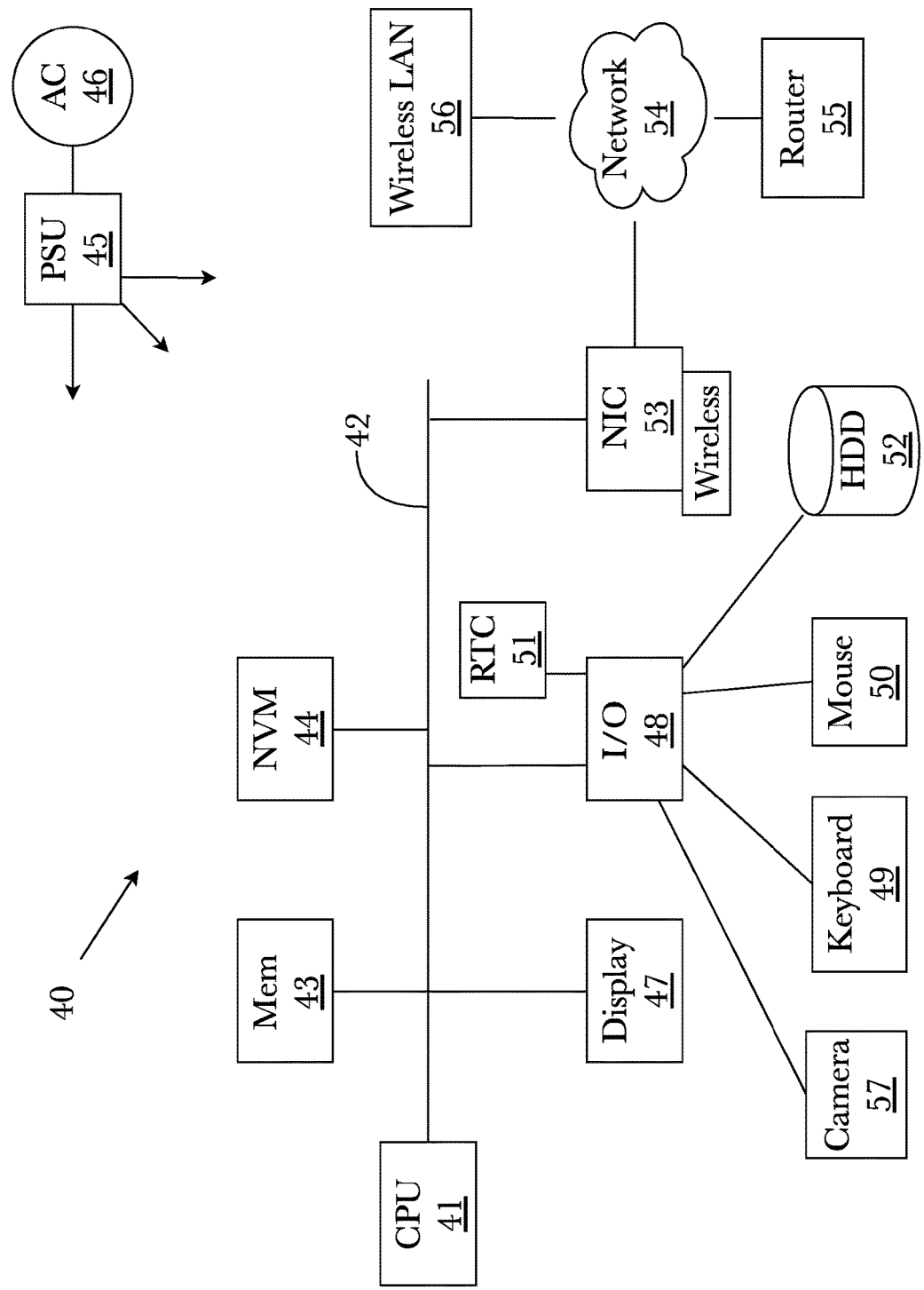
FIG. 14 is another block diagram illustrating an exemplary hardware architecture of a computing device.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for rendering of dynamic webpage content with no flicker or flash of original content, comprising:
   a memory;
   a processor;
   a web browser script operating on a web browser comprising a first plurality of programming instructions stored in the memory of, and operating on the processor of, a first networked computer, wherein the first plurality of programming instructions, when operating on the processor of the first networked computer, cause the first networked computer to:
receive annotated content and resources for rendering of a webpage from a first party content provider;
request modification rules from a third party content provider;
receive an incomplete portion of the modification rules for rendering of the annotated content from the third party content provider;
render the webpage using the incomplete portion of the modification rules;
request and receive asynchronous transmission of a remainder portion of the modification rules from the third party content provider; and
render the webpage using the remainder portion of the modification rules; and
a service-worker-based gateway comprising a second plurality of programming instructions stored in a memory of, and operating on a processor of, a second networked computer, wherein the second plurality of programming instructions, when operating on the processor of the second networked computer, cause the second networked computer to:
detect the request for modification rules from the web browser operating the web browser script to the third party content provider;
initiate a timer with a limit;
when the timer reaches the limit, request the incomplete portion of the modification rules from the third party content provider, the incomplete portion of the modification rules comprising a generated portion of the modification rules, the generated portion being sufficient to immediately render the webpage in a state such that subsequently rendering the webpage with the remainder portion of the modification rules will not result in resizing of webpage elements, relocation of webpage elements, or a flash of original content; and;
transmit the incomplete modification rules to the web browser operating the web browser script.

2. The system of claim 1, wherein fallback content is transmitted by the service-worker-based gateway along with the incomplete portion of the modification rules and the incomplete portion of the modification rules comprise instructions for applying the fallback content during the rendering of the webpage.

3. The system of claim 1, wherein the service-worker-based gateway provides a set of empty rules to unblock rendering of the website.

4. The system of claim 1, wherein the service-worker-based gateway provides cached content for rendering of the website.

5. The system of claim 1, wherein the service-worker-based gateway generates fallback content for rendering of the website.

6. A system for rendering of dynamic webpage content with no flicker or flash of original content, comprising:
a memory;
a processor;
a web browser script operating on a web browser comprising a first plurality of programming instructions stored in the memory of, and operating on the processor of, a networked computer, wherein the first plurality of programming instructions, when operating on the processor of the first networked computer, cause the networked computer to:
receive annotated content and resources for rendering of a webpage from a first party content provider, the annotated content comprising dynamically modifiable elements;
request modification rules from a third party content provider;
receive an incomplete portion of the modification rules for rendering of the dynamically modifiable elements of the annotated content from a service worker;
render the webpage using the incomplete portion of the modification rules;
request and receive asynchronous transmission of a remainder portion of the modification rules from the third party content provider;
render the webpage using the remainder portion of the modification rules; and
the service worker comprising a second plurality of programming instructions stored in the memory of, and operating on the processor of, the networked computer, wherein the second plurality of programming instructions, when operating on the processor of the networked computer, cause the networked computer to:
detect the request for modification rules from the web browser operating the web browser script to the third party content provider;
initiate a timer with a limit;
when the timer reaches the limit, request the incomplete portion of the modification rules from the third party content provider, the incomplete portion of the modification rules comprising a generated portion of the modification rules, the generated portion being sufficient to immediately render the webpage in a state such that subsequently rendering the webpage with the remainder portion of the modification rules will not result in resizing of webpage content, relocation of webpage content, or a flash of original content; and
send to the web browser the incomplete modification rules for rendering of the dynamically modifiable elements of the annotated content.

7. The system of claim 6, wherein fallback content is received from the third party content provider along with the incomplete portion of the modification rules and the incomplete portion of the modification rules comprise instructions for applying the fallback content during the rendering of the webpage.

8. The system of claim 6, wherein the service worker provides a set of empty rules to unblock rendering of the website.

9. The system of claim 6, wherein the service worker provides cached content for rendering of the website.

10. The system of claim 6, wherein the service worker generates fallback content for rendering of the website.

11. A method for rendering of dynamic webpage content with no flicker or flash of original content, comprising:
receiving annotated content and resources for rendering of a webpage from a first party content provider, the annotated content comprising dynamically modifiable elements;
requesting modification rules from a third party content provider using a web browser operating on a computing device;
detecting the request for modification rules at a service worker operating on the computing device;
initiating a timer with a limit;

when the timer reaches the limit, requesting an incomplete portion of the modification rules from the third party content provider, the incomplete portion of the modification rules comprising a generated portion of the modification rules, the generated portion being sufficient to immediately render the webpage in a state such that subsequently rendering the webpage with the remainder portion of the modification rules will not result in resizing of webpage content, relocation of webpage content, or a flash of original content;

using the incomplete portion of the modification rules to render the dynamically modifiable elements of the annotated content;

requesting and receiving asynchronous transmission of a remainder portion of the modification rules from the third party content provider;

rendering the webpage using the remainder portion of the modification rules.

12. The method of claim 11, wherein fallback content is received from the third party content provider along with the incomplete portion of the modification rules and the incomplete portion of the modification rules comprise instructions for applying the fallback content during the rendering of the webpage.

13. The method of claim 11, wherein the incomplete rules comprise an empty set of rules to unblock rendering of the website.

14. The method of claim 11, wherein the incomplete rules are accompanied by cached content for rendering of the website.

15. The method of claim 11, wherein fallback content for rendering of the website is generated when the timer reached the limit.

* * * * *